Patented Dec. 5, 1950

2,532,561

UNITED STATES PATENT OFFICE 2,532,561

BETA-TERTIARY-AMINOADIPONITRILES

Carl M. Langkammerer, Wilmington, Del., assignor to E. I. du Pont de Nemours & Company, Wilmington, Del., a corporation of Delaware No Drawing. Application May 21, 1948,
Serial No. 28,522

8 Claims. (Cl. 260—247)

This invention relates to a new class of organic compounds having amino substituents. More particularly, it relates to certain new nitriles having amino substituents, and to the polyamines obtained therefrom by hydrogenation.

Adiponitrile is a highly important industrial chemical, since it is the starting material for the preparation of many compounds, including hexamethylenediamine, a component of one of the principal nylons. Substituted adiponitriles are of considerable scientific and technical interest, per se or as precursors of a large number of compounds with diverse properties. Unfortunately, few substituted adiponitriles are available for study. In particular, there is no report in the literature of any adiponitrile having amino substituents, in spite of the fact that amino-substituted adiponitriles, as well as the polyamines obtained therefrom by hydrogenation of the nitrile groups, would open the way for further advances in many fields of chemistry.

It is an object of this invention to provide a new class of organic nitriles and their hydrogenation products. A further object is to provide amino-substituted adiponitriles and the amino-substituted hexanediamines obtainable therefrom by hydrogenation. Other objects will appear hereinafter.

These objects are accomplished by providing a new class of chemical compounds, the beta-tertiary aminoadiponitriles having the tertiary amino nitrogen atom directly joined solely to aliphatic carbon atoms, and their hydrogenation products, the 3-tertiary amino-1,6-hexanediamines in which the tertiary amino nitrogen atom is directly joined solely to aliphatic carbon atoms. The beta-tertiary aminoadiponitriles are prepared by reacting an aliphatic secondary amine with 1,4-dicyano-2-butene or with its isomer, 1,4-dicyano-1-butene. In either case the secondary amine adds to the double bond so that the amino nitrogen is attached to the carbon in the beta position relative to the cyano group. The 3-tertiary amino-1,6-hexanediamines are prepared by subjecting the beta-tertiary aminoadiponitriles to hydrogenation in the presence of a hydrogenation catalyst, such as metallic cobalt. Any of the catalysts known to reduce nitrile groups may be used in place of the metallic cobalt catalyst.

It has been found that only secondary amines add normally to the dicyanobutenes. Ammonia and primary amines either fail to give any reaction or lead to cyclization reactions involving the amino and nitrile groups. It has not been found possible to react secondary aromatic amines, such as N-methylaniline, with the dicyanobutenes. Thus the new compounds of this invention are adiponitriles having a tertiary amino group which is aliphatic, alicyclic or heteroalicyclic in character, attached to a carbon in the beta position relative to the cyano group, and the 3-tertiary amino-1,6-hexanediamines obtainable therefrom by hydrogenation of both nitrile groups. The new products of this invention may be otherwise expressed as aliphatic tertiary amines having the 1,4-dicyano-sec. butyl group as one of the substituents on the amino nitrogen, and as tertiary amines having the 1,6-diaminohexyl group as one of the substituents on the tertiary amino nitrogen. These new compounds have the general formula

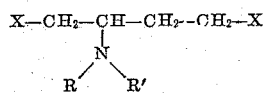

where X is a nitrile (—CN) radical or an aminomethyl (—CH$_2$NH$_2$) radical and R and R' are organic radicals attached to the nitrogen through aliphatic, i. e., non-aromatic, carbon, which radicals R and R' may together form a 5 to 7 member ring. Preferably R and R' are hydrocarbon or hydrocarbon interrupted by oxygen, sulfur, or nitrogen atoms.

The reaction for preparing the beta-tertiary aminoadiponitriles is represented by the equation:

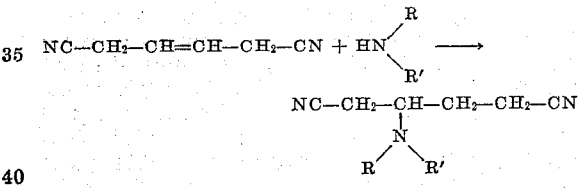

where R and R' are defined as stated above. This reaction is carried out by maintaining the dicyanobutene and the secondary amine in contact, if desired in an aqueous or inert organic solvent, until the addition product has formed. In general the reaction proceeds at low or ordinary temperature, e. g., between —10° C. and 25° C. but with the less reactive amines the temperature may be raised, for example up to 150° C. or even more if desired.

The two reactants are ordinarily used in substantially equivalent proportions but a slight excess, e. g., 5–10% by weight of one or the other does no harm. It may be desirable when working with a cheap amine to use a large excess of it, e. g. between 0.1 and 5 moles of amine per mole of dicyanobutene, to insure maximum conversion of the latter. Two or more secondary amines may be reacted simultaneously with the dicyanobutene.

The reaction is in general substantially complete within a few hours at room temperature, but no damage is done by prolonging it for longer periods such as several days or by heating the reaction mixture. The beta-tertiary aminoadiponitriles are in general crystalline materials which may be isolated by any convenient method such as filtration and recrystallization from an appropriate solvent.

Hydrogenation to the 3-tertiary amino-1,6-diaminohexanes is preferably carried out at temperatures within the range of 50 to 200° C. and at hydrogen pressures varying from about 500 lbs./sq. in. to the maximum pressure the equipment can withstand, for example 15,000 lbs./sq. in. or even higher. An inert solvent such as methanol or cyclohexane may be used if desired. Preferably, the hydrogenation is carried out in the presence of a sufficient amount of ammonia to suppress or diminish the formation of secondary amines. The hydrogenation catalyst may be any of the catalysts known to reduce nitrile groups to primary amino groups, such as alloy-skeleton cobalt, Raney nickel, platinum, palladium, and the like. The resulting triamines are best isolated by fractional distillation after removal of the catalyst.

Various beta-tertiary aminoadiponitriles and 3-tertiary amino-1,6-hexanediamines are illustrated in the following examples, in which parts are by weight.

*Example I*

Twelve hundred parts of a 30% aqueous dimethylamine solution and 212 parts of 1,4-dicyano-2-butene were mixed with agitation at room temperature. The solid 1,4-dicyano-2-butene gradually went into solution and after about an hour a new solid began to form. After standing for 24 hours at ordinary temperature the solid (246 parts) was filtered off. This was beta-dimethylaminoadiponitrile, which after recrystallization from toluene melted at 54–55° C. The yield was 82% of the theoretical.

Analysis: Calculated for $C_8H_{13}N_3$: N, 27.8.
Found N, 27.58.

*Example II*

Seventy-six parts of piperidine and 94 parts of trans-1,4-dicyano-1-butene were mixed at room temperature. On standing, the temperature of the reaction mixture rose to 39° C. in two hours. After standing at room temperature for about 16 hours the reaction mixture had solidified. Recrystallization from methanol gave 114 parts (67% yield) of beta-piperidinoadiponitrile, melting at 56–57° C.

Analysis: Calculated for $C_{11}H_{17}N_3$: C, 69.1; H, 8.95; N, 22.0.
Found: C. 69.0; H, 8.93; N, 21.24.

The same product was obtained when the trans-1,4-dicyano-1-butene was replaced by cis-1,4-dicyano-1-butene.

*Example III*

A mixture of 106 parts of 1,4-dicyano-1-butene (mixed cis- and trans-isomers) and 87 parts of morpholine was allowed to stand at room temperature for two weeks. Upon recrystallization of the reaction mixture from a mixture of methanol and water there was obtained 128 parts (66% yield) of beta-morpholinoadiponitrile, melting at 67–68° C.

Analysis: Calculated for $C_{10}H_{15}ON_3$: C, 62.1; H, 7.85; N, 21.75.
Found: C, 62.1; H, 7.87; N, 20.99.

*Example IV*

A mixture of 848 parts of 1,4-dicyano-1-butene (mixed cis- and trans-isomers) and 344 parts of piperazine was heated at 100° C. for 6 hours, then allowed to stand at room temperature for a week. By recrystallization of the reaction mixture from acetone there was obtained beta-piperazino-bis-adiponitrile, the addition product of one mole of piperazine to 2 moles of 1,4-dicyano-1-butene. This product melted at 172–174° C.

Analyis: Calculated for $C_{16}H_{22}N_6$: C, 64.3; H, 7.41; N, 28.1.
Found: C, 64.38; H, 7.54; N, 27.95.

*Example V*

An autoclave was charged with 57.4 parts of beta-piperidinoadiponitrile, 119 parts of methanol and 10 parts of finely divided metallic cobalt prepared by alkali extraction of a cobalt-aluminum alloy. The autoclave was heated at 100° C. with agitation, the reaction mixture being under a hydrogen pressure of 1500–2000 lbs./sq. in. Hydrogen absorption ceased after about one hour. After filtering off the catalyst, 50 parts of water was added to the liquid reaction product. Fractional distillation gave 29.6 parts (49.4% conversion) of 3-piperidino-1,6-diaminohexane, 3.3 parts of 4-piperidinohexamethylenimine, 5.0 parts of intermediate distillation cuts and 6.0 parts of non-distillable residue. The purified 3-piperidino-1,6-diaminohexane was a colorless liquid boiling at 102–103° C. at 0.3 mm. pressure, having a refractive index $n_D^{25}$: 1.4928 and a specific gravity $d^{25}$: 0.9458.

Analysis: Calculated for $C_{11}H_{25}N_3$: C, 66.28; H, 12.64; N, 21.08; neutralization equivalent, 66.4; molecular refractivity $M_D$ 61.60.
Found: C, 66.48; H, 12.47; N, 20.92; neutralization equivalent, 66.7; $M_D$ 61.23.

When this experiment was repeated with 52.2 parts of beta-piperidinoadiponitrile, 75 parts of anhydrous ammonia and 15 parts of cobalt catalyst at 90–110° C. and a hydrogen pressure of 9,000–14,000 lbs./sq. in. over a period of one hour, there was obtained 43.7 parts, corresponding to a conversion of 81%, of 3-piperidino-1, 6-diaminohexane, 0.55 part of 4-piperidinohexamethylenimine and 2.6 parts of non-distillable residue.

*Example VI*

The procedure of Example V was repeated using 50 parts of beta-morpholinoadiponitrile, 75 parts of anhydrous ammonia and 15 parts of cobalt catalyst. Hydrogen absorption occurred in the temperature range of 90–110° C. and at a pressure of 10,000–15,000 lbs./sq. in. over a period of 1½ hours. Distillation of the reaction product gave 42.9 parts (82.1% conversion) of 3-morpholino-1,6-hexanediamine, 0.25 part of 4-morpholinohexamethylenimine, 3.4 parts of intermediate distillation cuts and 2.5 parts of undistillable residue. The purified 3-morpholino-1,6-hexanediamine was a colorless liquid boiling at 123–126° C. at 0.7–0.8 mm. pressure, having a refractive index $n_D^{25}$: 1.4946 and a specific gravity $d^{25}$: 1.011.

Analysis: Calculated for $C_{10}H_{23}ON_3$: C, 59.66; H, 11.52; N, 20.87; molecular refractivity $M_D$, 58.62.

Found: C, 59.72; H, 11.75; N, 20.31; $M_D$, 58.02.

*Example VII*

The procedure of Example V was repeated using 61.1 parts of beta-dimethylaminoadiponitrile, 75 parts of anhydrous ammonia, and 40 parts of finely divided cobalt metal prepared by hydrogen reduction of cobaltous oxide. Hydrogen absorption occurred in the temperature range of 100–130° C. and at a pressure of 7,500–14,000 lbs./sq. in. over a period of 3½ hours. Distillation of the reaction product gave 63.6 parts (99% conversion) of 3-dimethylamino-1,6-hexanediamine, 0.6 part of 4-dimethylaminohexamethylenimine, and 1.5 parts of undistillable residue. The purified 3-dimethylamino-1,6-hexanediamine was a colorless liquid boiling at 112° C. at 6 mm. pressure and having a refractive index $n_D^{25}$: 1.4733 and a specific gravity $d^{25}$: 0.9061.

Analysis: Calculated for $C_8H_{21}N_3$: C, 60.32; H, 13.29; N, 26.38; neutralization equivalent, 53.1; molecular refractivity, $M_D$, 50.36.

Found: C, 60.85; H, 13.49; N, 25.97; neutralization equivalent, 52.7; $M_D$, 49.34.

The starting material, 1,4-dicyano-2-butene, may be prepared, for example, by the method described in U. S. Patent 2,342,101, or by the improved methods described in a number of recently filed applications such as Ser. No. 768,283 (Whitman, August 12, 1947), now Patent No. 2,477,674; Ser. No. 768,703 (Hager, August 14, 1947), now Patent No. 2,477,597; or Ser. No. 768,705 (Farlow, August 14, 1947), now Patent No. 2,518,608. The isomeric 1,4-dicyano-1-butene may be conveniently prepared by isomerization of 1,4-dicyano-2-butene in the presence of a hydrogenating metal such as copper or cobalt at elevated temperature, e. g. between 60 and 150° C., as described in application Ser. No. 756,097, filed by Hager on June 20, 1947, now Patent No. 2,451,386. Either 1,4-dicyano-2-butene or 1,4-dicyano-1-butene can be used separately, or their mixtures can be used.

The aliphatic beta-tertiary aminoadiponitriles of this invention may be made by addition to 1,4-dicyano-2-butene or 1,4-dicyano-1-butene of any secondary amine which is aliphatic, alicyclic or heteroalicyclic in character. Thus, in addition to the compounds of the examples, this new class of chemicals includes, for example, beta-diethylaminoadiponitrile, beta-diallylaminoadiponitrile, beta-di-n-butylaminoadiponitrile, beta-di-n-octylaminoadiponitrile, beta-di-n-dodecylaminadiponitrile, beta-distearylaminoadiponitrile, beta-dioleylaminoadiponitrile, beta-dicyclohexylaminoadiponitrile, beta-thiomorpholinoadiponitrile, beta-pyrrolidinoadiponitrile, beta-hexamethyleniminoadiponitrile, beta-di(beta-methoxyethylamino)adiponitrile, beta - N,N - methylhexamethylenediamino-bis-adiponitrile, and the like. Preferably, the radicals attached to the tertiary amino nitrogen contain between 1 and 16 carbon atoms. The most available secondary amines are those in which the radicals attached to the amino nitrogen are hydrocarbon, or hydrocarbon interrupted by oxygen, sulfur or nitrogen atoms, and the beta-tertiary aminoadiponitriles derived from such amines are therefore preferred. The radicals, other than 1,4-dicyano-sec.butyl, attached to the tertiary amino nitrogen may form together an alicyclic or heteroalicyclic ring of 5 to 7 members.

The 3-tertiary amino-1,6-hexanediamines of this invention include, in addition to those mentioned in the examples, 3-diethylamino-1,6-hexanediamine, 3-diallylamino-1,6-hexanediamine, 3-di-n-butylamino-1,6-hexanediamine, 3-di-n-octylamino-1,6-hexanediamine, 3-di-n-dodecylamino-1,6-hexanediamine, 3-distearylamino-1,6-hexanediamine, 3 - dioleylamino - 1,6-hexanediamine, 3-dicyclohexylamino-1,6-hexanediamine, 3-thiomorpholino-1,6-hexanediamine, 3-pyrrolidino-1,6-hexanediamine, 3-hexamethylenimidino-1,6-hexanediamine, 3 - di(beta - methoxyethylamino)-1,6-hexanediamine, 3,3'-N,N-methylhexamethylenediamine-bis-1,6-hexanediamine, and the like. Preferably the radicals attached to the tertiary amino nitrogen contain between 1 and 16 carbon atoms. The preferred triamines are those in which the radicals attached to the tertiary amino nitrogen are hydrocarbon, or hydrocarbon interrupted by oxygen, sulfur or nitrogen atoms.

The beta-tertiary aminoadiponitriles are useful as intermediates in the preparation of a large number of chemicals such as amides or acids by hydrolysis of the cyano groups, polyfunctional amines by the hydrogenation of the cyano groups, etc. They are also useful per se as insecticides, fumigants, solvents, etc. The 3-tertiary amino-1,6-hexanediamines are useful as polyamide ingredients and intermediates in chemical syntheses.

As many apparently widely different embodiments of this invention may be made without departing from the spirit and scope thereof, it is to be understood that I do not limit myself to the specific embodiments thereof except as defined in the appended claims.

I claim:

1. A beta-tertiary-aminoadiponitrile having the formula

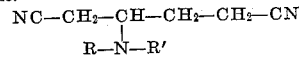

wherein R and R' are selected from the group consisting of alkyl radicals containing from 1 to 16 carbon atoms, monoalkenyl radicals containing from 3 to 16 carbon atoms, hydrocarbon radicals joined to each other to form with the tertiary amino nitrogen atom a five- to six-membered heteroalicyclic ring, and hydrocarbon radicals joined through a single atom of the class consisting of oxygen, nitrogen and sulfur to form with the tertiary amino nitrogen atom a five- to six-membered heteroalicyclic ring.

2. A beta-tertiary-aminoadiponitrile having the formula

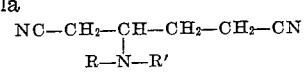

wherein R and R' are hydrocarbon radicals joined to each other to form with the tertiary amino nitrogen atom a five- to six-membered heteroalicyclic ring.

3. The chemical compound, beta-dimethylaminoadiponitrile.

4. The chemical compound, beta-piperidinoadiponitrile.

5. A beta-tertiary-aminoadiponitrile having the formula

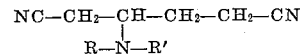

wherein R and R' are monoalkenyl radicals each containing from 3 to 16 carbon atoms.

6. A beta-tertiary-aminoadiponitrile having the formula $$NC-CH_2-CH-CH_2-CH_2-CN$$
$$\quad\quad\quad\quad |$$
$$\quad\quad\quad R-N-R'$$

wherein R and R' are alkyl radicals each containing from 1 to 16 carbon atoms.

7. The chemical compound, beta-morpholino-adiponitrile.

8. The chemical compound, beta-piperazino-bis-adiponitrile.

CARL M. LANGKAMMERER.

REFERENCES CITED

The following references are of record in the file of this patent:

UNITED STATES PATENTS

| Number | Name | Date |
|---|---|---|
| 1,992,615 | Hoffman et al. | Feb. 26, 1935 |
| 2,257,814 | Rigby | Oct. 7, 1941 |
| 2,408,959 | Stegemeyer | Oct. 8, 1946 |
| 2,448,755 | Zellner | Sept. 7, 1948 |